United States Patent [19]
Taggart, Jr. et al.

[11] 3,979,771
[45] Sept. 7, 1976

[54] MAGNETIC TAPE PHASE ENCODED DATA READ CIRCUIT

[75] Inventors: William Devore Taggart, Jr., Torrance; Franklin Satoshi Itami, Manhattan Beach, both of Calif.

[73] Assignee: Xerox Corporation, Stamford, Conn.

[22] Filed: Mar. 19, 1975

[21] Appl. No.: 559,635

[52] U.S. Cl. ................................. 360/51
[51] Int. Cl.² .......................................... G11B 5/09
[58] Field of Search .................... 360/42, 46, 51, 26

[56] References Cited
UNITED STATES PATENTS

| | | | |
|---|---|---|---|
| 3,493,868 | 2/1970 | Hackett, Jr. ........................ | 360/42 |
| 3,731,220 | 5/1973 | Besenfelder ....................... | 360/42 |
| 3,789,400 | 1/1974 | Towns ................................. | 360/26 |
| 3,887,942 | 6/1975 | Horowitz ............................ | 360/51 |

*Primary Examiner*—Vincent P. Canney
*Attorney, Agent, or Firm*—James J. Ralabate; Michael J. Colitz; Franklyn C. Weiss

[57] ABSTRACT

This digital circuit generates a window during which the data bit transitions of phase encoded data may be read from magnetic tape. This circuit contemplates a system for reading nine track tape and comprises one phase lock loop and window generator for each track, and the logic and control circuitry necessary to de-skew and output the data in the form of nine bit bytes. Each phase lock loop is individually free to correct itself to conform to the variations of its own track, and the control circuit can compensate for a total skew of up to four bit times.

8 Claims, 11 Drawing Figures

MAGNETIC TAPE PHASE ENCODED DATA READ CIRCUIT

BACKGROUND OF THE INVENTION

This invention relates to magnetic tape reading equipment and more particularly to an electronics circuit for generating an electronic window within which a voltage transition, which constitutes a phase encoded data bit, may be detected, Phase encoded data is recorded on a multi- track magnetic tape such that a one bit will be represented by a falling voltage transition and a zero bit will be represented by a rising voltage transition. These data bits are equally spaced along each track of a multi-track tape so that each data bit can be used not only for its data information but also for timing purposes. In this way, no separate clocking information need be recorded on the magnetic tape. Thus, a nine track tape can provide the data and timing for reading an eight bit byte plus a parity bit in parallel. If necessary, a phasing bit is used between like data bits to restore the voltage output to the phase required for the next data bit. For instance, if two consecutive one bits are to be recorded, and a one bit is a falling transition, then a phasing bit returning the voltage from a low level to a high level will be necessary between one bits. Likewise, a phasing bit comprising a falling transition is required between two zero bits, each of which is represented by a rising transition.

a typical magnetic tape system will have 1,600 bits per inch recorded on each tape track, will contain nine tracks per tape, and will be operated at tape speeds of from 45 to 150 inches per second. Theoretically, if the magnetic heads were perfectly aligned and if the magnetic tape were perfectly recorded and guided past the read/write heads, then all of the bits in each byte could read out simultaneously. However, a variety of misalignment of "skew" conditions arise.

Mechanical skew is created either when each of the nine read/write heads is not perfectly in line with all other heads or if the alignment of the resultant head assembly is not absolutely perpendicular to the direction of tape movement. Skew can also result from any wobble of the magnetic tape that results in less than perfect instantaneous alignment between the magnetic tape and the head assembly.

Electrical skew may be created during the recording process when the individual bits in each byte, for a variety of electrical and mechanical reasons, are not recorded in line on the magnetic tape. Also, some electrical noise may be generated during the read process. These problems are aggravated at high tape speeds and where there are a large number of bits per inch on the magnetic tape.

Another problem associated with reading phase encoded data is that the electrical equipment must be able to distinguish between a data bit and a phasing bit. This is usually accomplished by generating an electrical timing window which opens slightly ahead of the time when a data bit is expected and which closes some time after the data bit has been received, thus inhibiting the reading of a phasing bit. These window generating circuits rely on the timing of the data bits to generate an appropriate window. Since the mechanical and electrical skew problems associated with the reading and writing of phase encoded data results in long and short term variations between data pulses, the window must be automatically adjustable to match these long and short term variations.

Prior window generating circuits typically comprise a phase lock loop circuit implemented from capacitive, resistive, and inductive components to generate a sequence of windows, and rely on some kind of feedback from the timing of the data bits received to compensate for long and short term variations between a nominal window rate and the rate at which the data is actually being received.

However, there are a variety of problems associated with window generating circuits implemented from discrete components. To begin with, a circuit that relies on circuit time constants must be tuned for its particular application. This tuning must compensate not only for the requirements of the particular system, tape speed and bits per inch; but also must be tuned to account for the tolerances of the components from which this particular circuit was produced. Thus, each circuit must be individually tuned during the manufacturing process. This can be a substantial undertaking if the circuit has several different modes of operation. There will typically be one mode of operation when the tape reader first starts to read a data transmission from the magnetic tape, in which case the circuit time constants will be rapidly adjusted to quickly lock in on the appropriate frequency of data reception. After some preliminary period the time constants will be adjusted more slowly so that a correspondingly longer amount of time will elapse before making small corrections to compensate for long term drifts in the bit rate. Thus, in each analog circuit there may be a variety of circuit elements that need to be individually tuned, adversely affecting the manufacturability of the circuit.

An analog circuit is also sensitive to electrical noise and temperature variations which the designer must take into consideration. Also, circuit parameters tend to drift with time and must be periodically realigned. Thus, analog circuits designed to read phase encoded data are difficult to manufacture and to maintain.

Analog circuits are also difficult to modify. If the equipment must be redesigned either initially to correct design defects or ultimately to allow the tape reading system to handle higher speeds or bit packing densities, these analog circuits must be either substantially or completely redesigned.

Thus, there exists a need for a magnetic tape reading circuit which is easily designed, maintained and modified, and which will operate reliably under a variety of adverse electrical, mechanical and thermal conditions.

SUMMARY OF THE INVENTION

The described phase encoded data read circuit is implemented from digital components and will therefore exhibit a number of superior characteristics when compared to its analog equivalent. Because the speed of a digital circuit is dependent upon the clock rate at which it is driven, a digital circuit is independent of the electrical characteristic of its components, and is also independent of the ambient temperature within its operating temperature range. Likewise, because digital components incorporate input threshold signal levels, a well designed digital circuit is independent of the electrical noise environment in which it operates. Finally, unlike its analog equivalent, a digital circuit does not rely on the electrical characteristics of capacitors and other discrete components which must be charged or discharged over a period of time, and which must be tailored to suit the frequency requirements of the circuit. Therefore, a digital circuit can be instantaneously switched from any frequency to any other frequency within its operating range by a change of clock speed or circuit configuration. Finally, digital circuit modules and their individual components are completely interchangeable thus leading to an ease of manufacture and maintenance.

In addition to the above advantages which accrue from using digital as opposed to analog circuits, the preferred embodiment described herein, because of its use of programmable read-only memory (PROM) chips is easily modified. This is of importance during the original design process, where a design normally goes through several iterations before a final design is decided upon, and is also important after the unit has been in service for several years when it may become necessary to either redesign the circuit to take advantage of new technologies or to redesign the circuit to handle some capability that was not forseeable at the time of original design. This case of modification is a result of using PROM-Register pairs for most of the circuit elements, and may be explained as follows.

A typical counter is implemented from a line of flip-flops, referred to as a register, with appropriate outputs arranged through an intermediate set of lines and gates and fed back to the inputs so that the intended counting operation is implemented. Alternatively, the outputs of the register may be fed through a PROM back to the inputs of the register. In the latter case, the gating function is performed in the register and the logic and decoding functions are provided for in a PROM instead of a system of etched lines and gates. This results in the advantage that, in the second case, a circuit redesign may be accomplished simply by replacing the PROM whereas in the first case a circuit redesign necessitates the production of a new module. Similarly, the other logic functions required by the circuit may be implemented from a PROM rather than a system of lines and gates. Here also, the logic may be modified simply by replacing the PROM rather than redesigning the module.

It is therefore an object of this invention to provide a digital circuit for reading phase encoded data from magnetic tape which is not affected by its electrical or thermal environment, which is easily manufactured, which may be instantaneously switched between various tape speeds, and which may be easily redesigned.

DETAILED DESCRIPTION OF THE INVENTION

Figure 1A:
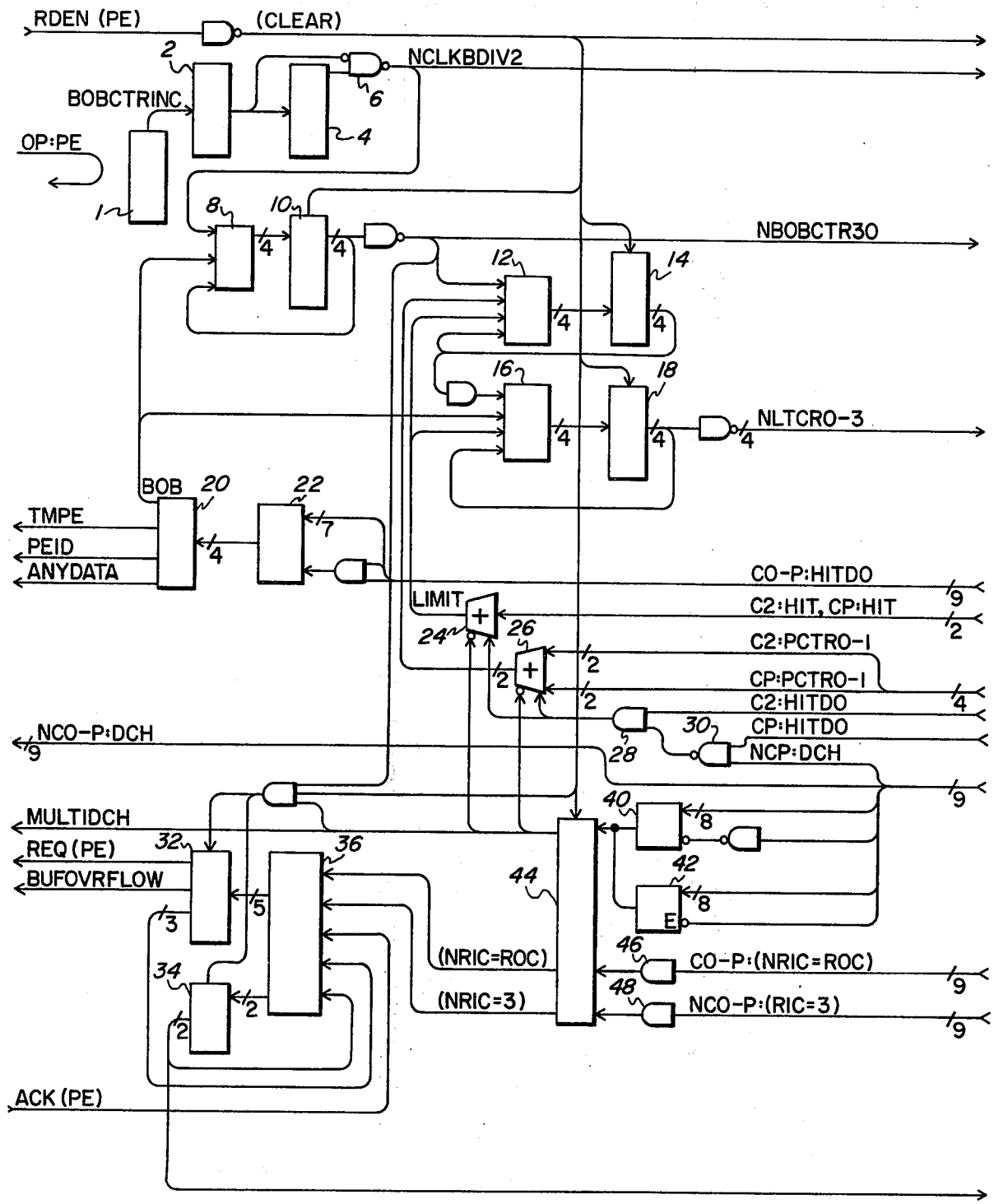
FIG. 1 consisting of FIGS. 1a and 1B is a block diagram of the phase encoded magnetic tape read circuit.

The preferred embodiment described herein comprises one Phase Lock Loop Circuit and one Temporary Storage Circuit for each of the nine tracks and one Control Circuit for controlling the entire system. A single Phase Lock Loop Circuit and its Temporary Storage are shown enclosed within the solid lines of FIG. 1B. FIG. 1A is a schematic of the Control Circuit.

Each block of digital data stored on tape consists of a series of eight bit bytes wherein the bits of each eight bit byte are recorded in parallel on each of eight tracks and a ninth track is reserved for a parity bit. Therefore, as the magnetic tape tracks proceed past the nine read heads an entire eight bit byte plus a parity bit is theoretically read out simultaneously by the equipment and may be output in parallel.

Figure 2:
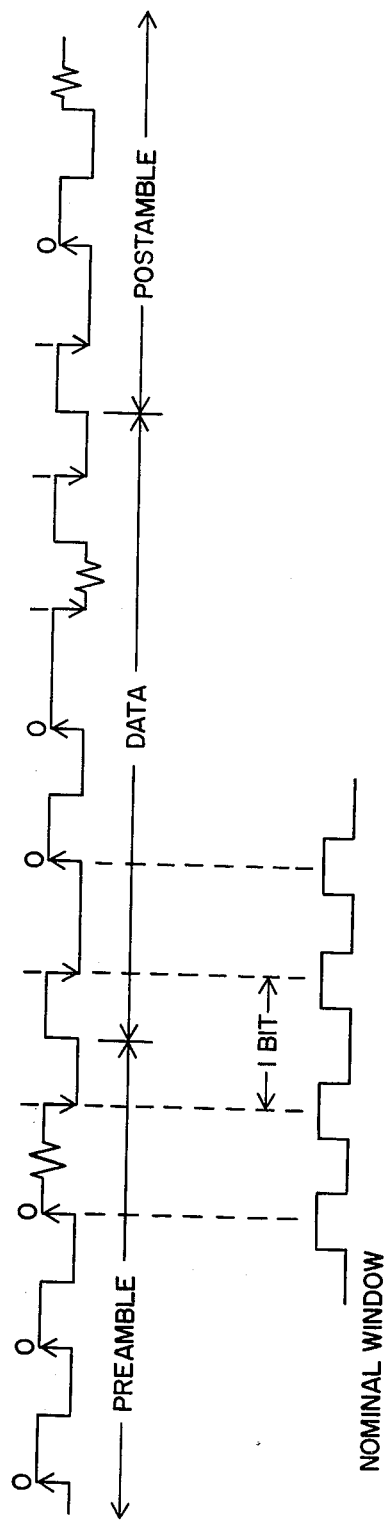
FIG. 2 is a timing diagram of the basic signals generated and used by the red circuit.

The bit stream comprising a block of data begins with a preamble which this system uses for synchronization purposes. The preamble consists of 39 zero bits as shown in FIG. 2 followed by a one bit. The system can effectively use this preamble bit stream to synchronize the production of a window because the system is assured that all rising transitions are data bits and all falling transitions are phasing bits, and therefore ignore all falling transitions. In the process of synchronizing itself with the incoming bit stream an effort is made by each individual circuit to synchronize by the thirtieth zero bit. However, the initial synchronizing operation may result in the loss of one or several zero bits. It is for this reason that the final bit in the preamble is a one bit, thereby notifying the reading circuitry that the following bit is the first bit of actual data.

As shown in FIG. 2 the stream of bits following the preamble comprises the data bits and may be a record of any length. a series of ones and zeros is shown to illustrate all combinations of data bits and phasing bits.

Following the last data bit is a postamble which as can be seen from FIG. 2 as the mirror image of the preamble in that it is a one followed by 39 zeros. This particular bit pattern notifies the system that the data transmission has ended. A further consequence of having the postamble arranged as a mirror image of the preamble is that the data may be read in either direction. Of course, if the data is being read in an opposite direction the data must be reversed before it can be used. In most applications, this magnetic tape reading equipment is used in conjunction with a computer, which can easily be programmed to reverse a data stream.

At higher bit packing densities and tape speeds, it becomes more likely that there will be a significant difference in time between the reading out of each of the nine bits of a byte as the tape progresses past the nine read heads. There is a short term variation of approximately 5 or 10 percent from one bit to the next. There are also long term variations corresponding to varying tape speed and vibration. Finally, as the equipment ages, the alignment of the heads in relation to the magnetic tape may deteriorate. Thus, in the worst case, there might be two or three bits difference between tracks. That is, the electronic equipment may be reading the second or third data bit on one track before it has read the first data bit on another track. It is for this reason that the data bits, when read, are not directly output. Each track stores the last four data bits in a temporary storage device. Thus, the control circuit can wait until all the bits of a particular byte are read from the mag tape before outputting that byte plus parity.

Figure 1B:
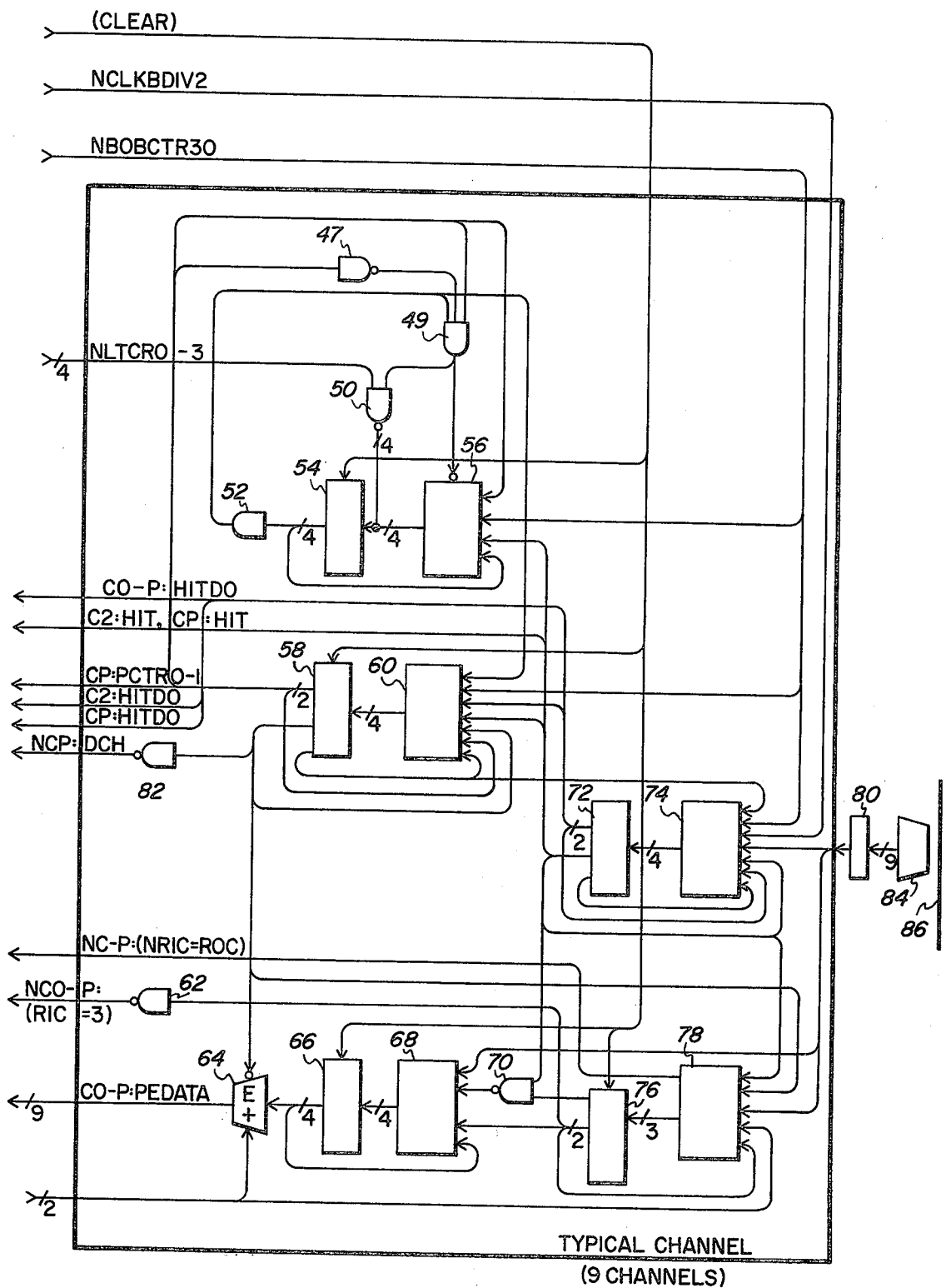

The functions as described above are performed by the circuit shown in the block diagram in FIGS. 1A and 1B. Beginning at the start of the preamble, the counter comprising Flip-flops 2 and 4 and Gate 6 of FIG. 1A receives a system clock with a repetition rate equal to the nomial data bit rate, and divides by two, resulting in an application of every other bit to the Counter comprising PROM 8 and Register 10. This latter counter is implemented to count up to 15, which is the equivalent of 30 preamble zero bits. At the completion of its count, at which time the Phase Lock Loop in each track should have synchronized with the input data stream, a synchronization complete signal is generated and sent to other parts of the circuit. The main function of this synchronizing step is to mask out the phasing bits which do not contain any timing or data information and to generate a window that will bracket the data bit. Additionally, after 30 counts the remaining circuitry is notified by this counter that the first one bit received will correspond to the last data bit of the preamble so that each track circuit may start storing data bits.

During the first thirty bit times each Phase Lock Loop Circuit is allowed to synchronize on all positive transitions, including noise pulses. However, the noise pulses average out and at the end of the thirty bit period there is a statistical probability that all circuits are synchronized properly with relation to the data transmission. Likewise, at the reception of the fortieth one bit, the circuit will begin to store data in its temporary storage devices.

Nine data lines are fed to each of PROMs 40 and 42 from the Phase Lock Loop Circuits 54, 56, 58 and 60 of FIG. 1B, one of which is shown. If any one data line does not indicate the reception of a bit, this indication will be sent out on the corresponding NCO-P:DCH line to indicate a dead channel. The equipment can recover from the effect of one dead channel by using the parity bit to generate the missing data. However, if PROMs 40 and 42 detect more than one dead channel, the multi-dead channel line, MULTIDICH, will go true indicating that no recovery is possible at this point, the tape drive will be commanded to go through a try and try again procedure so that this data block may be read. Ultimately, if a multi-dead channel indication cannot be avoided, the circuit will signal an inoperative system. Notice that one line from Gate 82 is shown leading into nine input lines to PROM 40. This is because there are nine Gates 82, one for each track providing inputs to PROM 40.

The BOB signal output from Register 20 of FIG. 1A, which is used in conjunction with PROM 22, is a beginning of block signal and is generated when PROM 22 receives information from every track that the first preamble bit has been received. This is an enabling signal which enables Counters 8 and 10 to start counting. The input to Flip-Flops 2 and 4 is a system clock which has a rate equal to the anticipated bit rate. Therefore, when preamble data is first encountered by every magnetic track read head, the BOB signal is applied to the Counters 8 and 10 which count 30 data pulses beofre activating the Phase Lock Loop Circuit. In this way, The system is started only when there is data on all nine magnetic tape tracks and will not begin to operate on random noise.

PROM 12 in conjunction with Register 14, and PROM 16 in conjunction with Register 18 generate long term variation corrections which are fed to the Phase Lock Loop Circuits comprising PROMs 56 and 60 and Registers 54 and 58, the phase Lock Loop for one magnetic tape track. This Phase Lock Loop Circuit receives a clock whose frequency is twenty-four times that of the anticipated data rate. Using this clock input, the Phase Lock Loop generates a window once every 24 clock pulses. This electronic window opens six clock pulses before the time when the data bit is expected and will remain open, if no data bit is received until six clock pulses after the data bit was expected. If there is a long term variation between the anticipated and actual bit rates, the window will tend to be consistently early or late, depending on the direction of the long term variation. This long term variation is corrected by PROM Register Pairs 12 and 14, and 16 and 18. PROM 12 and Register 14 comprise a three or eight bit counter which will either count up or down depending on whether the last data bit was received earlier or later than expected. PROM 16 and Register 18 store the resultant counter output information. When the counter overflows, either positively or negatively, a clock pulse will be added or subtracted to the 24 clock pulse per data bit cycle to either accelerate or delay the generation of subsequent windows. In this way, long term variations are compensated for. Since the correction rate through a three bit counter is much more rapid than that through an eight bit counter, the three bit counter is used for initial set up of the Phase Lock Loop and, after stable operation has been reached the eight bit counter is used to compensate more slowly for long term variations.

These counters are driven by the master track which is defined as the center track on the magnetic tape. The center track of the magnetic tape was selected because it is least susceptable to tape wobble as the tape is fed past and the read/write heads and is least susceptable to losing the information bearing magnetic film on which the data is recorded.

The Phase Lock Loop Circuit consists of PROM Register pairs 54, 56, and 58, 60. The upper PROM Register pair counts through each six bit quadrant and the lower PROM Register pair counts four guadrants per cycle thus making a total count of 24 bits per cycle.

PROM 74 in conjunction with Register 72 receives data pulses from Data Read Circuit 80 which transforms the data read from the magnetic tape into strobe pulses. The window generated in Phase Lock Loop Circuits 54, 56, 58 and 60 is applied to PROM 74 to allow a data strobe to generate a data signal, which is fed to PROMs 74 and 78. In fact, PROMs 74 and 78 will generate a bit from either a transition bit or a data bit input but because of the window generation of PROMs and Registers 54 through 60, only a data bit will be received and acted upon by PROMs 74 and 78. The resultant data bit is strobed into the Deskew Buffer 66 either as a high or low bit.

PROM 68 receives the strobe and the data bit at the same time, generates either a one or a zero and loads it into the four bit Deskew Buffer 66. PROM 78 is a Pointer and Register 76 is a counter which, in conjunction with PROM 78, loads the bit received into one of four locations in the Deskew Register 66, the address being determined by the Pointer Register combination 76 and 78. Since there are four locations in the Deskew Buffer 66, the PROM Register pair 76, 78 is a four bit counter which sequentially points to each location in the Deskew Buffer Register 66. After each data bit is loaded into the Deskew Buffer Register the pointer is incremented by one. After the fourth address the counter is automatically incremented back to zero so that data is constantly being overlayed in the Deskew Buffer Register. this, bits are read one at a time from the magnetic tape but are always stored along with the three previous bits in the Deskew Buffer Register. It is because of this storage that the ultimate data output may be transmitted one full byte at a time even though one track may come in up to four bit times later than another. The Control Circuit waits until all nine data bits are stored before transmitting the entire byte.

In the Control Circuit there is a Read Out Counter implemented from prom 36 and Registers 32 and 34. As each full byte is completely assembled in the various Deskew Buffer Registers, it is read out and then the Read Out Counter will be incremented for the next full byte. One Read Out Counter services all nine Deskew Buffer Registers 66. A logical check is implemented in this circuitry to ensure that data is not read from the Deskew Buffer before it is loaded into the Deskew Buffer from the data generation circuit. Also, if an overlap of greater than four bits ever occurs, the overflow condition will be detected and a signal sent out on the BUFOVRFLOW line to indicate a malfunction.

PROM 22 and its associated Register 20 provide status signals to the rest of the system. These signals are a tape mark signal, a tape identification signal and a gap detector signal. The gap detector signal is an indication that the channel used as the master track has become inoperative, allowing the system to switch to an alternate master track for system synchronization. If the alternate track also shows a gap then the multi-dead track line MULTIDCH is activated signaling that the data is no longer usable. Registers 24 and 26 instruct the Three and Eight Bit Counters 12 through 18 whether a data bit occurred in the window and if so whether it occured in the first or second quadrant of the window so that the counters may average out accordingly.

When a data stream preamble is first received, the Phase Lock Loop Circuit 54 through 60 is allowed to set up a window and start its normal cycling on any positive going transition since it expects zero data bits. At this stage the Phase Lock Loop is allowed to synchronize on noise spikes as well. Also, the Phase Lock Loop is started off with a 24 clock cycle which is the nominal cycle. The Phase Lock Loop Circuit operates this way for eighteen cycles and then proceeds to look for zero bits only during the window time. Simultaneously long term variation corrections are supplied by the Three Bit Counters 12 and 14. In this way the Phase Lock Loop can rapidly adjust to the preamble data bit timing. At the count of thirty cycles, operation should have settled down and the reading of the data stream begins.

Figure 3A:
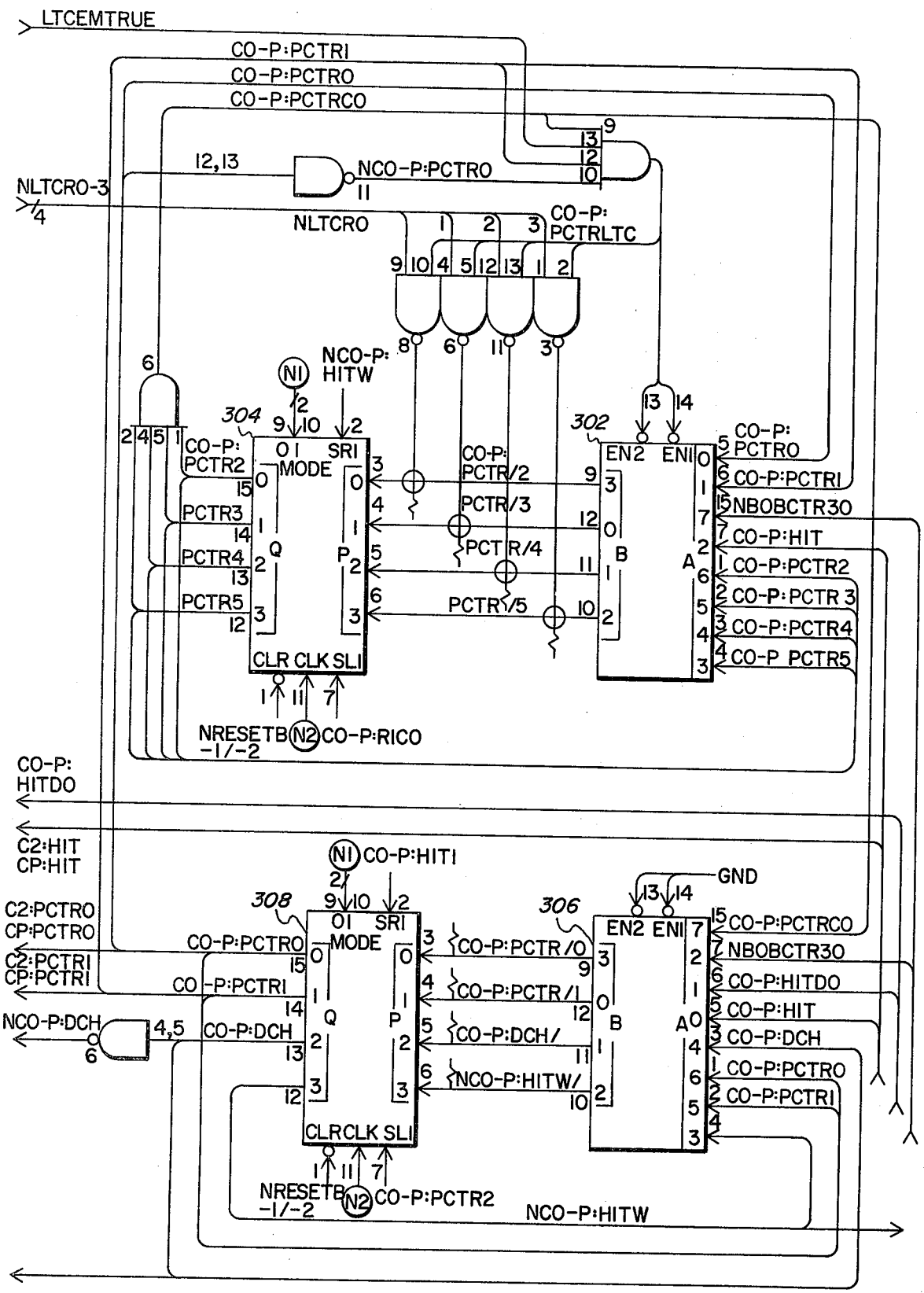
FIG. 3 consisting of FIGS. 3A, 3B and 3C is a detailed schematic of the phase lock loop portion of the read circuit.

FIGS. 3A through 3C and 4A through 4E correspond respectively to FIGS. 1B and 1A and show the actual circuit details. In FIG. 3A PROM 302 receives its inputs from Register 304 and supplies its outputs to Register 304, which together constitute the top half of the Phase Lock Loop Circuit. The data flows from the four outputs on the left hand side of the PROM 302 to the four inputs on the right hand side of the Register 304 and from the four outputs on the left hand side of the Register back around to the eight inputs on the right hand side of the PROM. The Register is clocked so that the counting operation is synchronous with the rest of the system. A second counter comprising PROM 306 and Register 308, together with the previous PROm Register pair 302 and 304, comprise the Phase Lock Loop Circuit which counts a nominal 24 clocks per complete window cycle. This circuit is implemented so that PROM 302 and Register 304 count six clock pulses per quadrant while PROM 306 and Register 308 count four quadrants per cycle. The count is initiated by the NBOBCTR30 line which is shown on FIG. 3A as coming in on the right side of the schematic and is shown in FIG. 1A as being generated by Counter 8 and 10 in the upper left corner. That is, when the 15 data bit counter 8 and 10 begins counting, the Phase Lock Loop Circuit is initiated also. Offsets from the Three and Eight Bit Counters 12 through 18 are brought into the Phase Lock Loop Circuit of FIG. 3A on line NLTCRO-3 which lengthens or shortens the 24 clock cycle time by one clock increments or about 4 percent. These correction bits are received by the least significant part of the Counter, which is PROM 302 and Register 304. Theoretically, the upper set of devices need only count to six so a three bit counter would be sufficient. However, since corrections of up to six more clocks may be added, the total count can go to twelve, requiring a four bit counter. The four quadrants of the total 24 clock count correspond to a six bit early window, a six bit late window and two quadrants of dead time during which reading of the phasing bit will be inhibited. The correction constants are inserted during the dead time so that the twelve bit window is not disturbed.

The control logic is implemented so that a received data bit automatically results in a centering of the window so that if the following data bit occurs exactly 24 clock periods later, it will occur exactly between the two window quadrants. This centering of the window is done at the reception of every data bit. Whether this data bit was received early or late in comparison to the prior data bit will be recorded and counted by the Three or Eight Bit Counters 12 through 18 of FIG. 1A which correct for long term variations. As was stated previously, the Three Count is used during the first thirty bits of the preamble and the Eight Count is used thereafter. During the first 30 bits, if a transition is received outside of the window the circuits will automatically center the window on the pulse received and reset the Three Bit Counter. If the pulse is received inside of the window then the Three Bit Counter will output one correction for every three inputs. Of course, these parameters, and all others described may be changed simply by changing patterns in the PROMs.

Since there always exactly four quadrants per cycle, only the top two lines of the PROM Register pair 306 and 308 of FIG. 3A are required for this counting operation. The output from PROM 306 Pin 11 is a latch which signals the existence of a dead channel. The output from Pin 10 of PROM is used as an inhibit line and is sent to the data receiving circuitry, PROM Register Pair 310 and 312 to inhibit the reception of phasing bits.

PROM Register pair 310 and 312 receive data pulses on the CO-P:HITO line, and if more than thirty counts of preamble information have been received, a strobe is generated and sent to the Deskew Buffer PROM Register Pair 318 and 320. If a strobe is not generated, a dead channel indication is sent out on the CO-P:HIT line. Furthermore, if more than two consecutive bits are skipped a dead channel indication is output on the OC-P:HITDO line of Register 312.

Figure 3B:
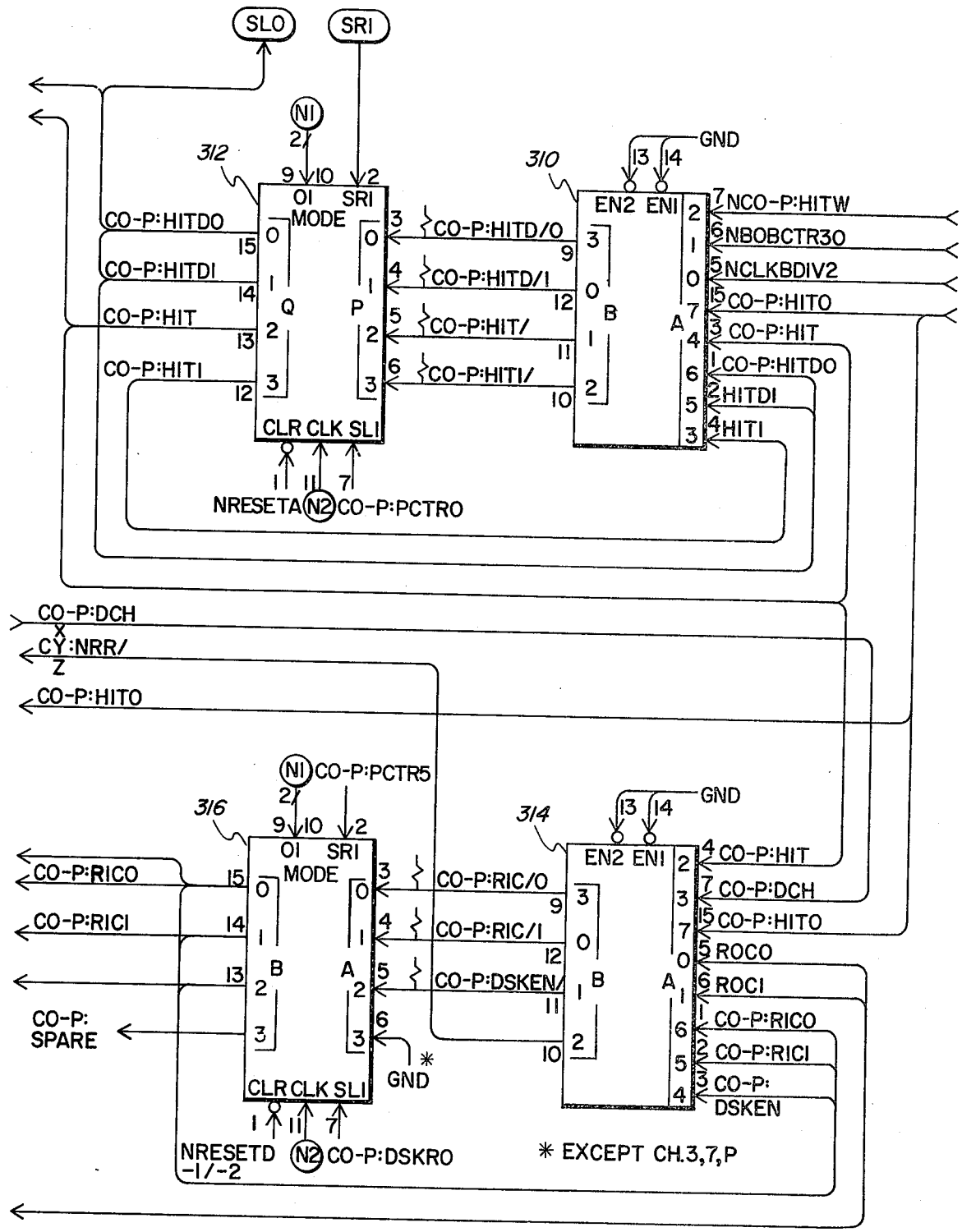
Figure 3C:
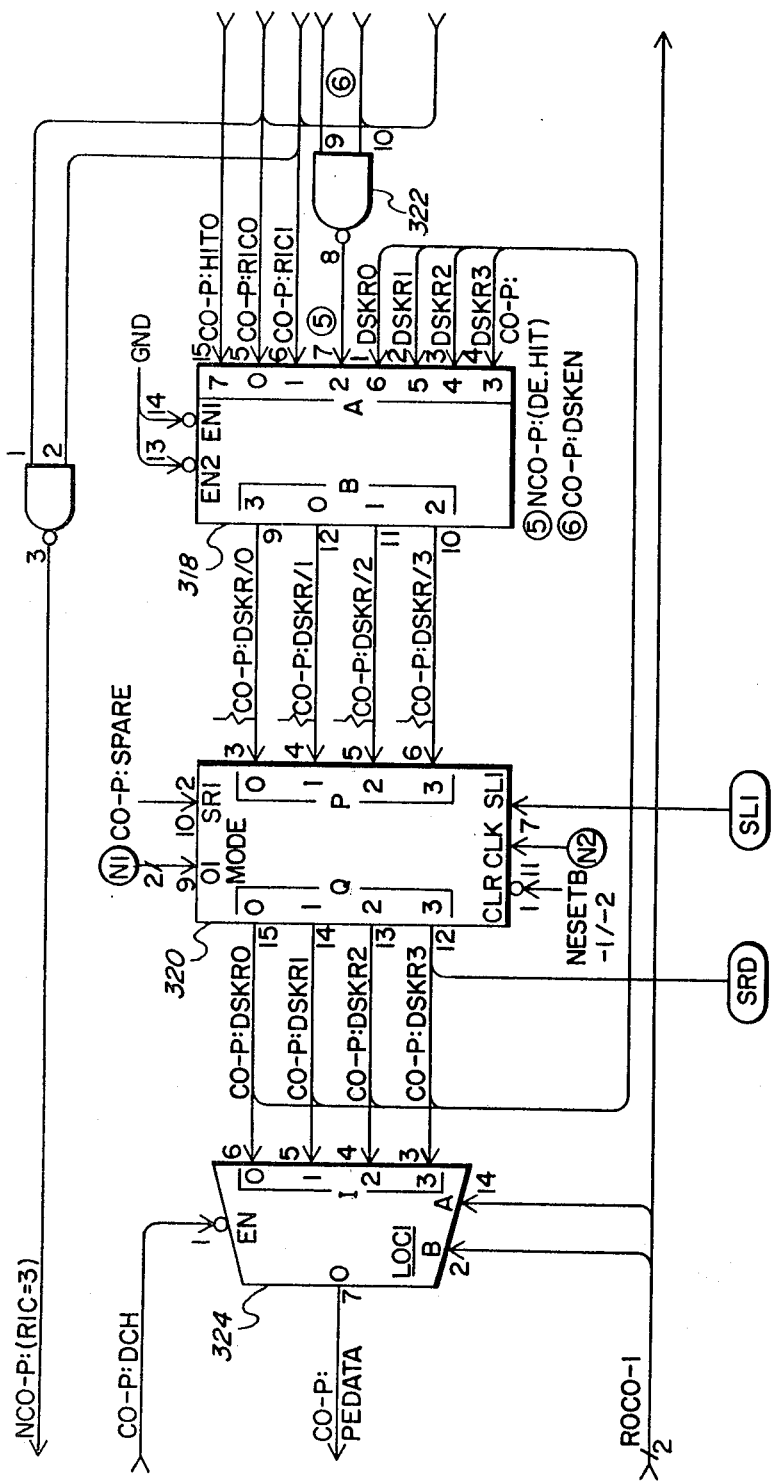

The PROM Register pair 314 and 316 in Figure 3B constitute the Channel Address Pointer which indicates to the Deskew Buffer comprising PROM 318 and Register 320 of FIG. 3C in which of four positions to load the most recently received data bit. This Channel Address Pointer 314 and 316 is a two bit counter and can therefore address any one of the four locations of Register 320. Input Pin 5 of Register 316 is an enable line which signifies the end of a preamble and therefore allows the next bits to be loaded into the Deskew Buffer Register 320.

The Deskew Buffer 320 is used in conjunction with PROM 318 and receives its addressing information and data bit at the inputs to the PROM 318. The enable signal received from the output Pin 13 of Register 316 is ANDed in AND Gate 322 with a hit signal output from Pin 13 of Register 312 and is used to clock or strobe data into Register 320. The inputs to PROM 318 also include the address generated by the Channel Address Pointer 314 and 316. In this way the four locations in Deskew Buffer Register 320 are loaded with the appropriate data bits. Finally, an output from the Decode Pointer 34 and 36 of FIG. 1A is received at Multiplexer 324 of FIG. 3C on line ROCO-1 and determines which of these four bits will be output to the Control Circuit. This decode counter information is also supplied to PROM 314 which is implemented to ensure that a location in Deskew Buffer Register 320 is not read from it before it is written into. An attempt to read from a Deskew Buffer location before that location is loaded results in an overflow indication and the data is ignored. This indication results in a reread of that section of tape or any other corrective action which may be initiated by the system.

FIGS. 4A through 4E comprise is a detailed schematic of the Control Circuit and corresponds to FIG. 1A. Register 402 of FIG. 4A contains the flip-flops which count down the BOBCTRINC signal by two. This signal is a clock with a repetition rate equal to that expected of the data bit rate. the counted down output is then transmitted to PROM 410 and Register 412 of FIG. 4B which constitute a 15 bit counter. Considering that the input to the 15 bit counter is counted down by two, it can be seen that the result is a count down by 30. The full count is sensed by Gate 414 which generates a signal on the NBOBCTR-30 line. A gate in this case is used for the decoding function rather than a PROM because a gate is approximately four times faster.

Figure 4A:
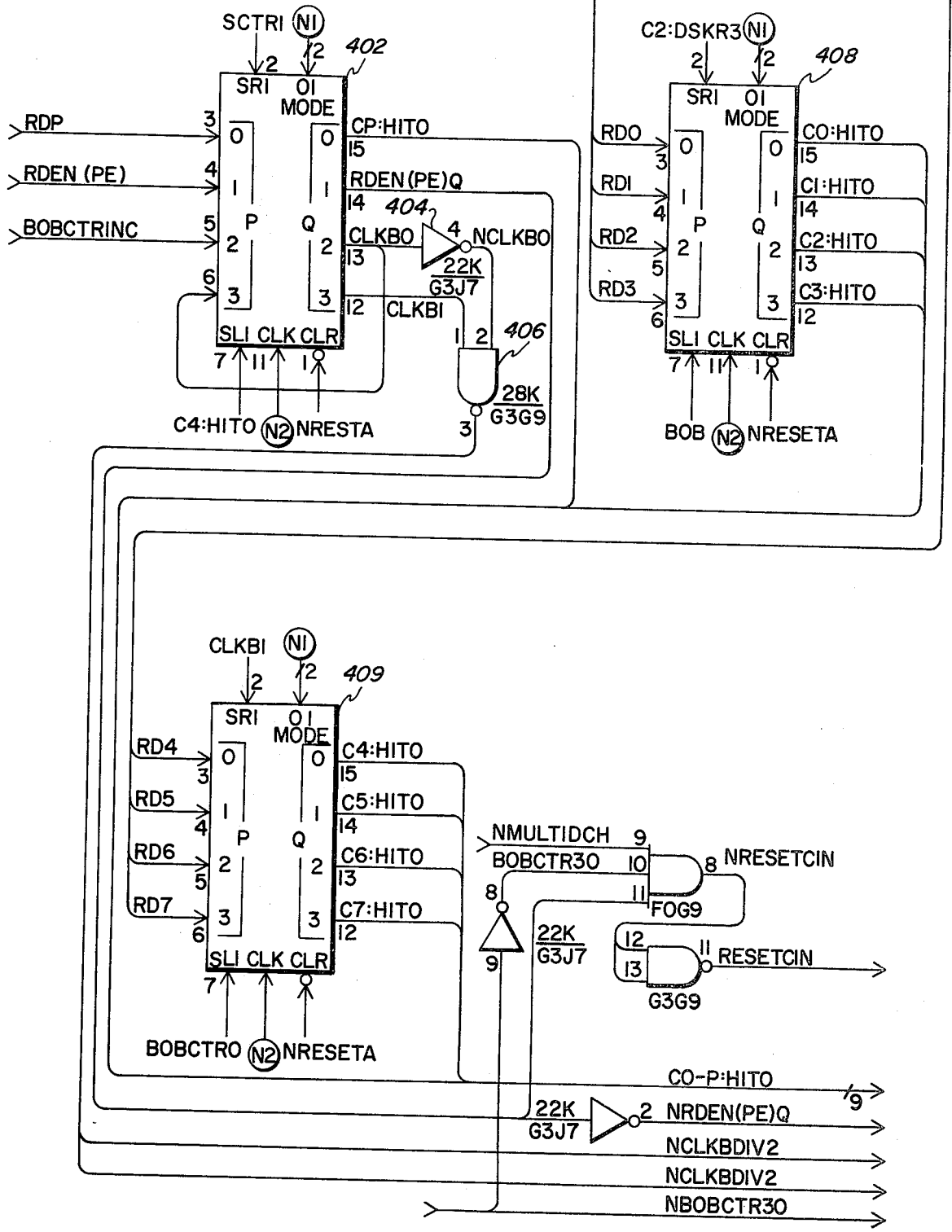
FIG. 4 consisting of FIGS. 4A, 4B, 4C, 4D, and 4E is a detailed schematic of the control portion of the read circuit.
Figure 4B:
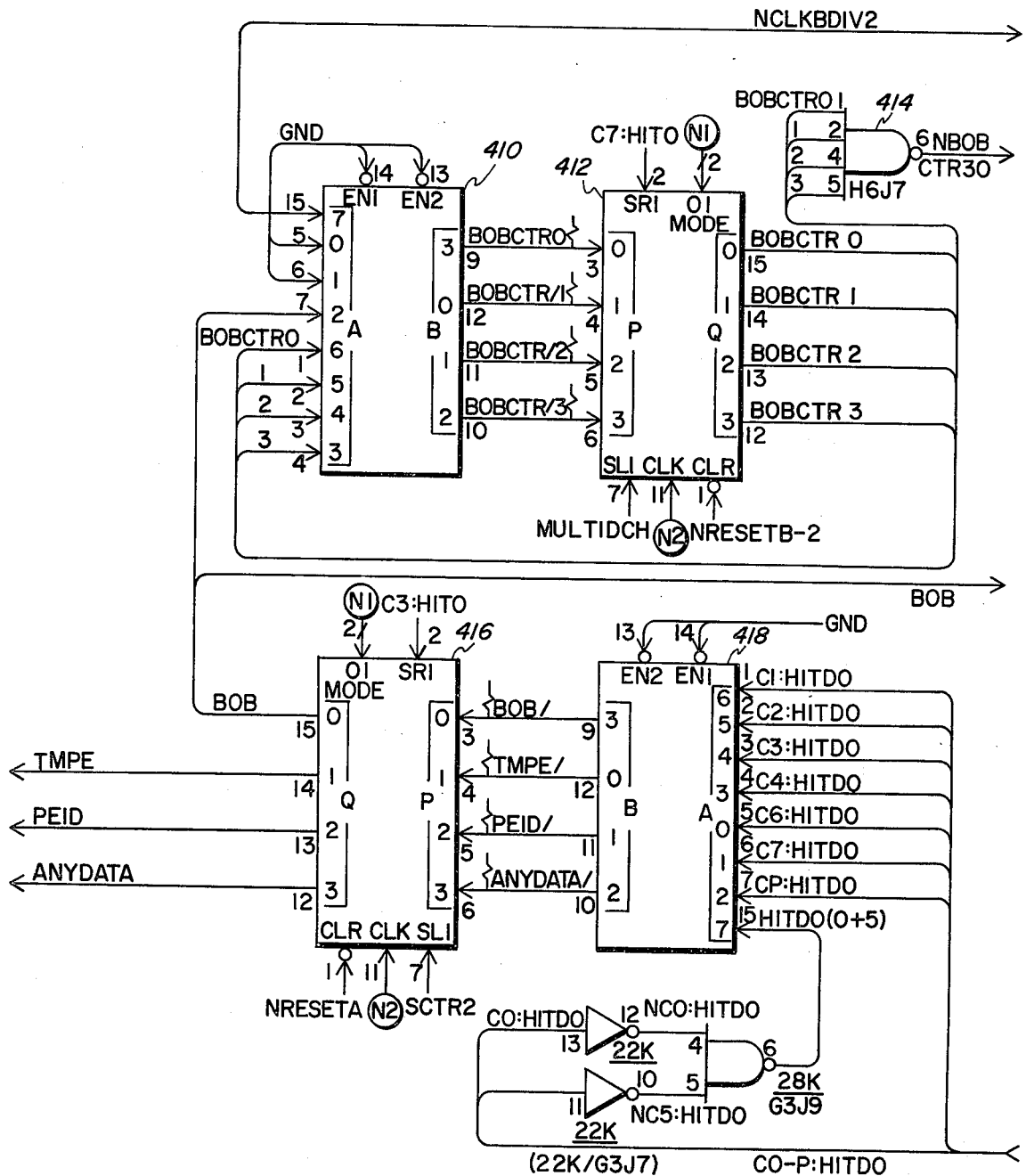

PROM 418 and Register 416 of FIG. 4B correspond to PROM 22 and Register 20 of FIG. 1A and generate signals used as a tape mark, a phase encoding identifier, and a line indicating whether data is being received. These three identifier signals are used in other parts of the system. The fourth output of Register 416, the BOB line, is used internally and indicates that the system is recording information.

Figure 4C:
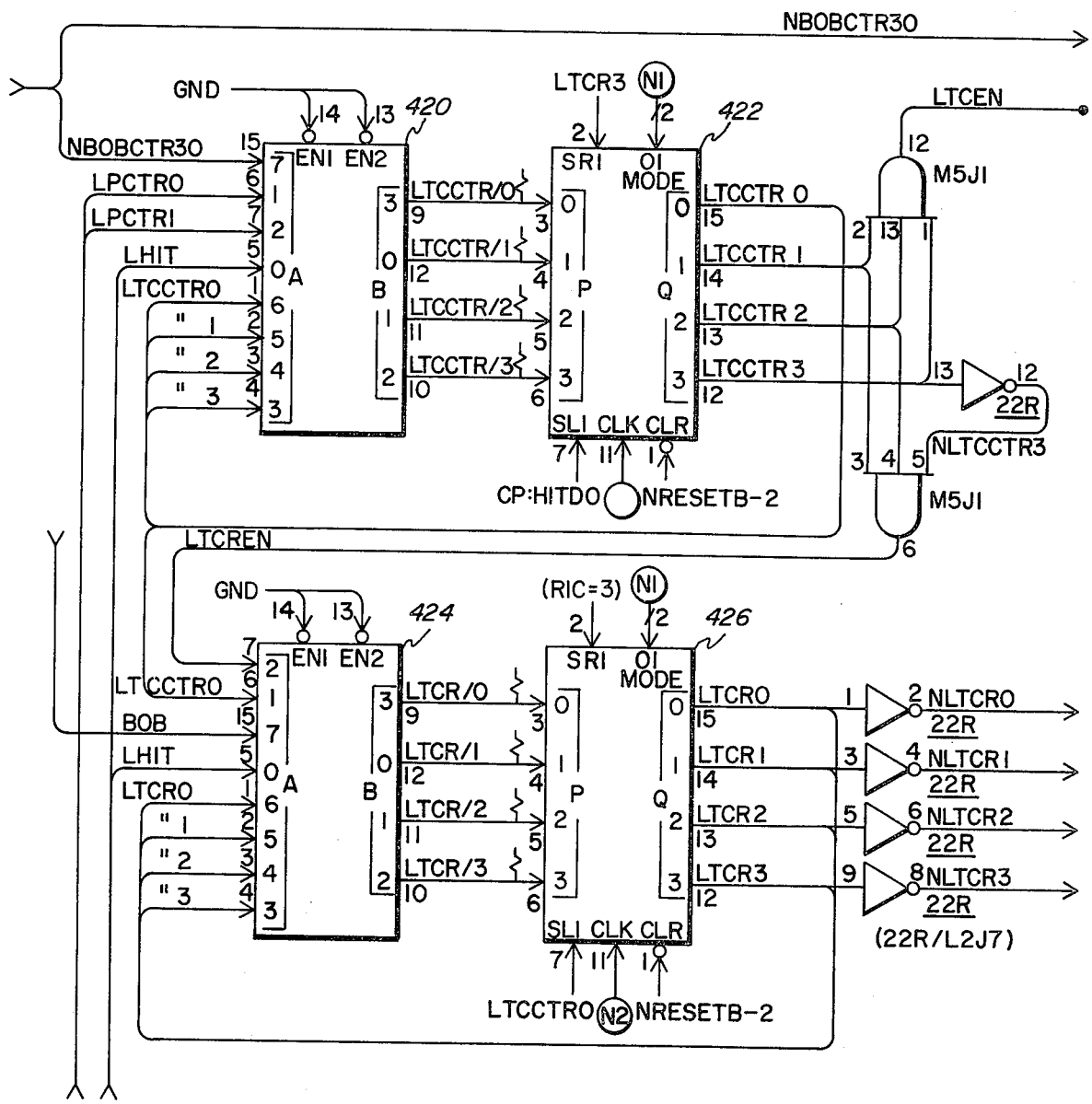

PROM 420, in conjunction with Register 422 in FIG. 4C is implemented as a counter which counts forward or backward up to either three or eight depending on the control line from Gate 414. This PROM Register pair 420 and 422 accepts inputs in terms of data window position from the master track of the tape, and will count up or down depending on whether the data bit was received early or late. Any offset correction bit generated by PROM Register Pair 420 and 422 is stored in PROM Register Pair 424 and 426 for ultimate transmission to the Phase Lock Loop Circuits. PROM Register Pair 424 and 426 are limited to a correction of plus or minus two counts. Greater offsets would create a probability of a serious malfunction in that the system may begin to trigger on a phasing bit than a data bit. For corrections greater than two counts, there is an increased probability of the phasing bit failling inside the window.

Figure 4D:
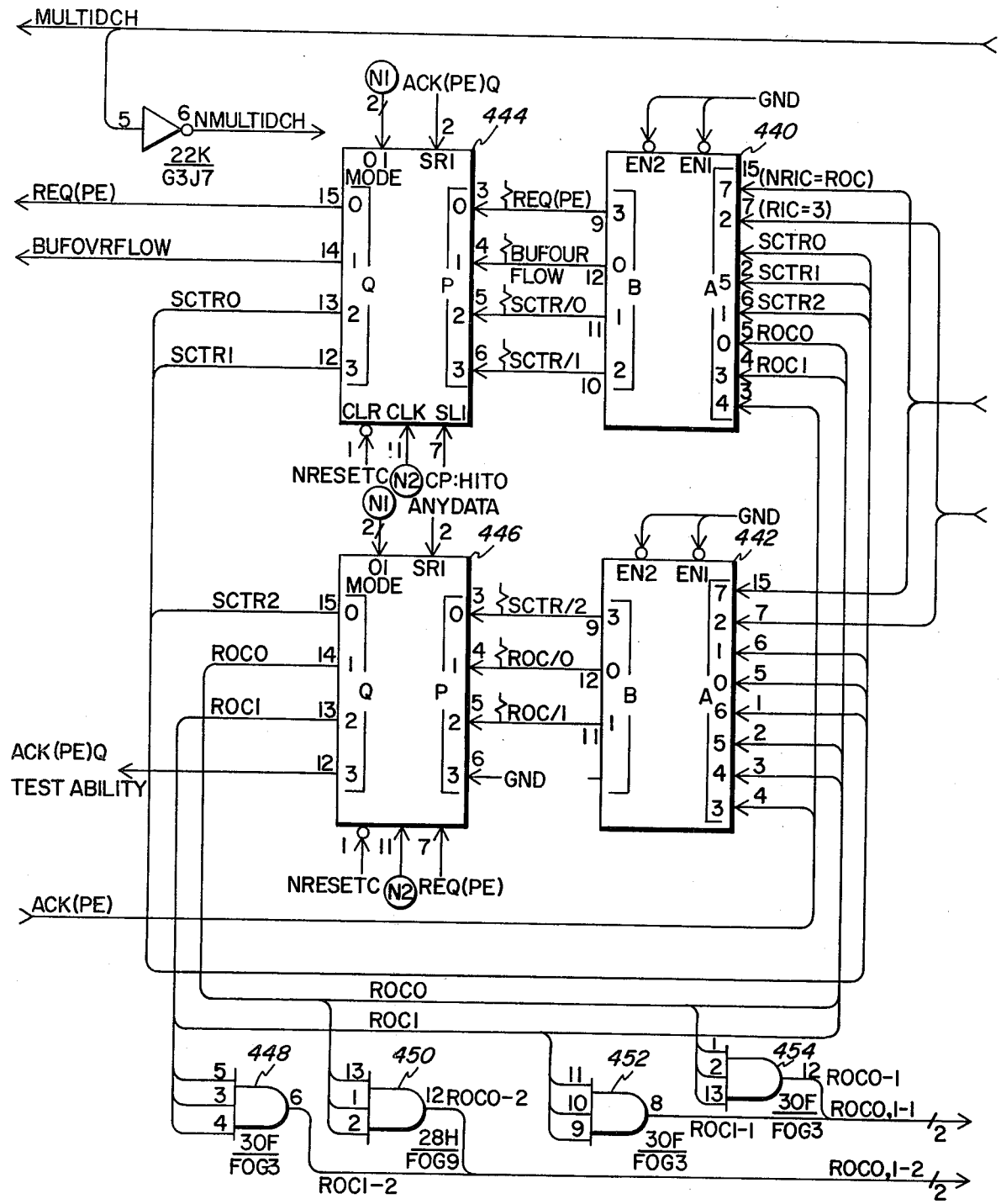
Figure 4E:
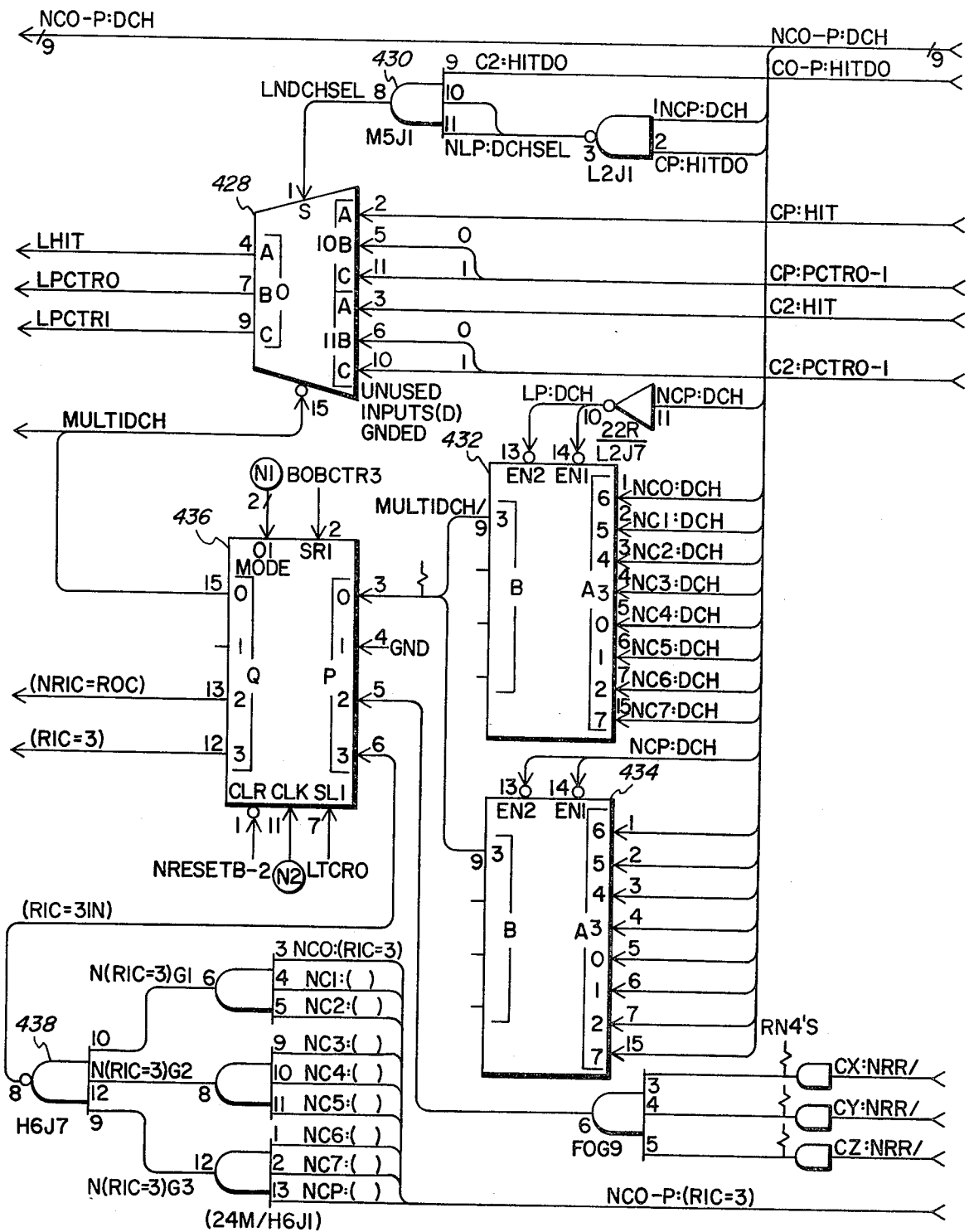

Multiplexer 428 of FIG. 4E receives information from both the master track and the alternate master track and will determine, based on a signal from Gate 430, which set of outputs to use to control the three or eight bit Counter 420 and 422. Gate 430 receives its input on line NCO-P:DCH which is an indication of whether the master channel or track is operative. On an indication that the alternate master is also inoperative, an output will be generated to indicate that there are two or more dead channels. A multi-dead channel indication is fed to the enable input of Multiplexer 428 on line MULTIDCH and, in the case of multi-dead channels, will disable the Multiplexer.

PROMs 432 and 434 in conjunction with Register 436 simply receive logic signals and establish the proper timing for them through Register 436 which is clocked by the regular system clock. Gate 438 compares the addresses of the Deskew Buffers 320 of FIG. 3C against the Byte Pointer 446 of FIG. 4D. When this signal output from Gate 438 goes true, the system is ready for one byte of output. At this point the byte is output and the Output Pointer 446 is incremented. Again, the Byte Pointer waits until all Channel Address Pointers 314 and 316 have been incremented before another byte is transmitted. In this way, data is prevented from being loaded into a Deskew Buffer 320 location after an attempt is made to read out from that location. If an overflow condition is generated as a result of there being a greater than four bit difference in timing between channels an overflow signal will be generated.

The Output Pointer logic is contained within PROMs 440 and 442 of FIG. 4D in conjunction with Registers 444 and 446. These consitute a counter which is incremented once for each byte output. This is the counter output that is compared against each individual byte address, which comparison must be made before a byte may be transmitted.

Gates 448, 450, 452 and 454 are simply driver circuits since the output of Register 446 must be sent to nine track or channel circuits.

It is to be understood that the above described arrangement is merely illustrative of the principles of the invention. For example, this invention could be used in a system that has either more or less than nine tracks. Also, specific circuit components such as programmable logic arrays could be used instead of programmable read only memory devices.

While a particular embodiment of the present invention has been described and illustrated, it will be apparent to those skilled in the art that changes and modifications may be made therein without departure from the spirit and scopr of the invention as claimed.

What is claimed is:

1. A digital circuit for reading phase encoded data from a magnetic tape comprising:
   a read head for reading data bits and phasing bits which comprise phase encoded data from said magnetic tape,
   a phase lock loop circuit for generating from said data bits and electronic window defining that portion of each data bit cycle during which a data will be read by said read head, said phase lock loop circuit comprising:
   a. digital counter means for receiving said data bits and for counting a number of time intervals between said data bits, and b. decoder means for receiving said digital counter means output and producing an electronic window therefrom, and logic means for producing as an output each bit received by said logic means from said read head during the time defined by said window, and for inhibiting the output of each bit received during the time interval between windows.

2. A digital circuit for reading phase encoded data from a magnetic tape having a plurality of tracks comprising:

a read head per track for reading data bits and phasing bits from said magnetic tape, a phase lock loop circuit per track for generating from said data bits an electronic window defining that portion of each data bit cycle during which a data bit will be read by the associated read head, said phase lock loop circuit comprising:

a. digital counter means for receiving said data bits and for counting a number of time intervals between said data bits, and b. decoder means for receiving said digital counter means output and producing an electronic window therefrom, and a logic circuit per track for producing as an output each bit received by said logic circuit from its associated read head during the time defined by said window, and for inhibiting the output of each bit received during the time interval between windows.

3. A digital circuit for reading phase encoded data from a magnetic tape having a plurality of tracks comprising:

a read head per track for reading data bits and phasing bits from said magnetic tape, a phase lock loop circuit per track for generating from said data bits an electronic window defining that portion of each data bit cycle during which a data bit will be read by the associated read head, and a logic circuit per track for producing as an output each bit received by said logic circuit from its associated read head during the time defined by said window, and for inhibiting the output of each bit received during the time interval between windows, a temporary storage means per track for receving output data bits from said associated logic means, and for storing each data bit for a time equal to a fixed number of data bit cycles, and a control circuit for sequentially reading complete bytes from said temporary storage means wherein each of said complete bytes comprises one bit from each temporary storage means, said reading being performed immediately upon the reception of all bits of each byte by said temporary storage means.

4. The apparatus of claim 3 wherein each data bit received, through said logic means from said read head is coupled to said associated phase lock loop means, and wherein each electronic window generated by each of said phase lock loop circuits is generated so that it is centered about a point in time exactly one data bit cycle period after the point in time when said data bit was received.

5. The apparatus of claim 4 further comprising:

counting means coupled to one of said plurality of phase lock loop circuits for counting down one bit for each time time the data bit received by said phase lock loop circuit is received during the first half of said electronic window, for counting up one bit for each time the data bit is received during the second half of said electronic window, for overflowing when the absolute value of said counting means contents exceeds a predetermined number, and for decreasing or increasing by a predetermined amount the time between electronic windows for each of said overflows.

6. The apparatus of claim 5 further comprising:

means for varying the preselected number of counts required for a counting means overflow so that a smaller count will be required during a preselected period of time at the beginning of a series of data bit receptions and a larger count will be required thereafter.

7. The apparatus of claim 6 further comprising:

clock means for generating a continuous series of clock pulses, the frequency of said clock pulses being a prdetermined multiple of the data bit frequency, and wherein said phase lock loop circuit comprises, a. a register implemented from a plurality of flip-flops, the clock input of said register coupled to the clock output of said clock means, and b. a programmable read-only memory (PROM), the outputs of said PROM coupled to the inputs of said register, the outputs of said register and the data bit coupled from said read head through said logic means to the address inputs of said PROM, said PROM programmed such that said register and PROM constitute a counter circuit for generating a complete window cycle and said data bit constitutes a resetting signal to center the next window generated on a point in time one data bit cycle period after said data bit.

8. A digital circuit for reading phase encoded data from a magnetic tape having a plurality of tracks comprising:

a read head per track fro reading data bits and phasing bits from said magnetic tape, a phase lock loop circuit per track for generating an electronic window for each data bit, each of said windows being centered about a point in time occurring one data bit cycle period after each of said data bits are received, a logic circuit per track for receiving said electronic windows from said phase lock loop circuit, for receiving said data bits and said phasing bits from said read head, for inhibiting the output of bits received outside said window and for enabling the output to said phase lock loop circuit of bits received within said windows, whereby said data bits will be enabled and said phasing bits will be inhibited, a temporary storage circuit per track for storing every data bit output of said logic circuit for a time equal to a predetermined fixed number of data bit cycle periods, and a control circuit for accessing from said temporary storage circuits each byte as soon as it is completely loaded into said temporary storage circuits, wherein said byte consists of a set of associated data bits intended to be recorded on and read from said magnetic tape in parallel.

* * * * *

UNITED STATES PATENT AND TRADEMARK OFFICE
CERTIFICATE OF CORRECTION

PATENT NO. : 3,979,771
DATED : September 7, 1976
INVENTOR(S) : William O. Taggart et al It is certified that error appears in the above-identified patent and that said Letters Patent are hereby corrected as shown below:

Claim 5, line 4, delete "each time time" and insert --each time--.

Claim 8, line 4, delete "fro" and insert --for--.

Signed and Sealed this

Twenty-fifth Day of January 1977

[SEAL]

Attest:

RUTH C. MASON
Attesting Officer

C. MARSHALL DANN
Commissioner of Patents and Trademarks